(12) United States Patent
Venkatesan et al.

(10) Patent No.: US 10,268,286 B2
(45) Date of Patent: Apr. 23, 2019

(54) CONTROLLING POWER DISTRIBUTION TO HAPTIC OUTPUT DEVICES

(71) Applicant: Immersion Corporation, San Jose, CA (US)

(72) Inventors: Srivatsav Venkatesan, Sunnyvale, CA (US); Kaniyalal Shah, Fremont, CA (US); Douglas George Billington, Campbell, CA (US); Stephen Rank, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 131 days.

(21) Appl. No.: 14/979,350

(22) Filed: Dec. 22, 2015

(65) Prior Publication Data

US 2016/0179220 A1    Jun. 23, 2016

Related U.S. Application Data

(60) Provisional application No. 62/096,095, filed on Dec. 23, 2014.

(51) Int. Cl.
*G06F 3/01* (2006.01)
*G06F 3/038* (2013.01)
*A63F 13/285* (2014.01)
*A63F 13/23* (2014.01)

(52) U.S. Cl.
CPC ............ *G06F 3/0383* (2013.01); *A63F 13/23* (2014.09); *A63F 13/285* (2014.09); *G06F 3/016* (2013.01); *A63F 2300/209* (2013.01); *G06F 2203/013* (2013.01)

(58) Field of Classification Search
CPC .. G06F 3/016; G06F 3/0383; G06F 2203/013; H04M 19/04; A63F 13/285
See application file for complete search history.

(56) References Cited

U.S. PATENT DOCUMENTS

| | | | | |
|---|---|---|---|---|
| 7,182,691 | B1 * | 2/2007 | Schena | A63F 13/06 |
| | | | | 345/161 |
| 2001/0045935 | A1 | 11/2001 | Chang et al. | |
| 2002/0080112 | A1 * | 6/2002 | Braun | G06F 3/016 |
| | | | | 345/156 |
| 2004/0183782 | A1 | 9/2004 | Shahoian et al. | |
| 2005/0030284 | A1 | 2/2005 | Braun et al. | |
| 2011/0163860 | A1 * | 7/2011 | Ryu | G06F 3/016 |
| | | | | 340/407.2 |

(Continued)

FOREIGN PATENT DOCUMENTS

| | | |
|---|---|---|
| EP | 2 796 965 A2 | 10/2014 |
| WO | 01/24158 A1 | 4/2001 |

*Primary Examiner* — Robert J Michaud
(74) *Attorney, Agent, or Firm* — Miles & Stockbridge P.C.

(57) ABSTRACT

Systems and methods for controlling power and/or current consumption for multiple haptic output devices are provided. Various features of the haptic output device may be described within a data structure. In response to a haptic instruction, a power budget for the haptic output device may be determined in accordance with its operational characteristics. A drive signal may then be applied to the haptic output device to produce the haptic effect in accordance with the calculated power budget. The calculated power budget may be configured to limit the current or power drawn by the haptic output device.

25 Claims, 12 Drawing Sheets

(56) References Cited

U.S. PATENT DOCUMENTS

2013/0214914 A1* 8/2013 Grant .................. G06F 3/016
 340/407.1
2014/0317934 A1 10/2014 Kramer
2014/0347177 A1 11/2014 Phan et al.

* cited by examiner

| Actuator Index 810 | Priority 820 | Request Queue 830 | Bidirectional 840 | Startup Current Maximum 850 | Settling Time 860 | Steady State Current 870 | Status 880 | Haptic Write 890 |
|---|---|---|---|---|---|---|---|---|

CONTROLLING POWER DISTRIBUTION TO HAPTIC OUTPUT DEVICES

PRIORITY APPLICATION

This application claims the benefits of U.S. Provisional Patent Application No. 62/096,095, filed on Dec. 23, 2014, which is incorporated herein by reference in its entirety.

FIELD OF INVENTION

The embodiments are generally directed to electronic devices, and more particularly, to electronic devices that produce haptic effects.

BACKGROUND

Video games and video game systems have become extremely popular. Video game devices or controllers typically use visual and auditory cues to provide feedback to a user. In some interface devices, kinesthetic feedback (e.g., active and resistive force feedback) and/or tactile feedback (e.g., vibration, texture, temperature variation, and the like) may be provided to the user. In general, such feedback is collectively known as "haptic feedback" or "haptic effects." Haptic feedback provides cues that enhance and simplify a user's interaction with a video game controller, or other electronic device. For example, haptic effects may provide cues to users of video game controllers or other electronic devices to alert the user to specific events, or provide realistic feedback to create greater sensory immersion within a simulated or virtual environment.

Other devices in which a user interacts with a user input element to cause an action also may benefit from haptic feedback or haptic effects. For example, such devices may include medical devices, automotive controls, remote controls, and other similar devices.

SUMMARY OF THE INVENTION

Embodiments of the present invention are directed toward electronic devices configured to produce haptic effects that substantially improve upon the related art.

Features and advantages of the embodiments are set forth in the description which follows, or will be apparent from the description, or may be learned by practice of the invention.

In one example, systems and methods for controlling power consumption of a haptic output device associated with a data structure are provided. The systems and methods are configured to receive a haptic drive instruction, determine a power budget for a target haptic output device based on its operational characteristics, and apply a drive signal to the target haptic output device to produce a haptic effect, the drive signal based on the power budget.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 8 illustrates a data structure according to an example embodiment of the present invention.

DETAILED DESCRIPTION

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Example embodiments are directed toward systems and methods for controlling power and/or current consumption for multiple haptic output devices. Throughout this detailed description, reference will be made to controlling power and/or current consumed by the haptic output devices, and it should be understood by one of ordinary skill in the art that the embodiments may be readily applied to limit current and/or power. Various features of the haptic output device may be described within a data structure. For a haptic instruction generated by a host device (e.g., gamepad or console), a power budget for the haptic output devices may be determined in accordance with information stored within the data structure. A drive signal may then be applied to the haptic output devices to produce a haptic effect in accordance with the calculated power budget. The calculated power budget may be configured to limit the current or power drawn by the haptic output device.

In the various embodiments, a variety of user interfaces and methods for using a device are described. In some embodiments, the device is a portable electronic device (e.g., a game controller, console, mobile phone, smartphone, tablet, etc.). It should be understood, however, that the user interfaces and associated methods may be applied to numerous other devices, such as personal computers, medical devices, laptops, and the like that may include one or more other physical user-interface devices, such as a keyboard, mouse, trackball and the like.

Figure 1:
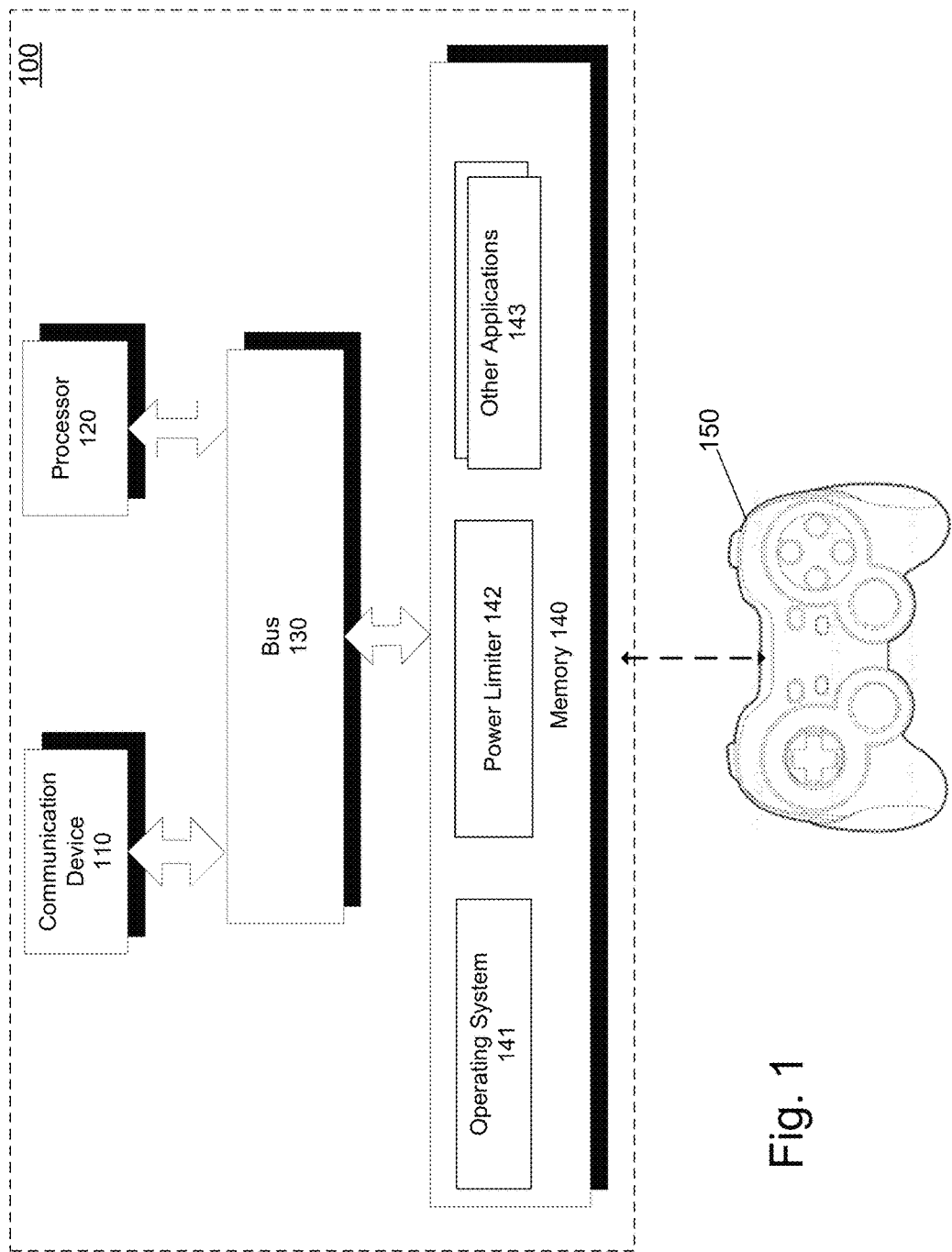
FIG. 1 illustrates a block diagram of a system according to an example embodiment of the invention.

FIG. 1 illustrates a block diagram of a system 100 according to an example embodiment of the invention.

System 100 may include a communication device 110 configured to transmit and/or receive data from remote sources. Communication device 110 may enable connectivity between a processor 120 and other devices by encoding data to be sent from processor 120 to another device over a network (not shown) and decoding data received from another system over the network for processor 120.

For example, communication device 110 may include a network interface card that is configured to provide wireless network communications. A variety of wireless communication techniques may be used including infrared, radio, Bluetooth, Wi-Fi, and/or cellular communications. Alternatively, communication device 110 may be configured to provide wired network connection(s), such as an Ethernet connection.

Processor 120 may comprise one or more general or specific purpose processors to perform computation and control functions of system 100. Processor 120 may include a single integrated circuit, such as a micro-processing device, or may include multiple integrated circuit devices and/or circuit boards working in cooperation to accomplish the functions of processor 120. In addition, processor 120 may execute computer programs, such as an operating system 141, a power limiter module 142, and other applications 143, stored within memory 140.

System 100 may include memory 140 for storing information and instructions for execution by processor 120. Memory 140 may contain various components for retrieving, presenting, modifying, and storing data. For example, memory 140 may store software modules that provide functionality when executed by processor 120. The modules may include operating system 141 that provides operating system functionality for system 100. The modules may further include power limiter module 142 that may control the power or current drawn by haptic output devices of controller 150. In certain embodiments, power limiter module 142 may include instructions for dynamically calculating a power budget for each haptic output device of controller 150. System 100 also may include one or more additional application modules 143 that include additional functionality, such as peripheral firmware configured to provide control functionality for a peripheral device, such as controller 150 (e.g., a gamepad, wearable device, etc.).

Non-transitory memory 140 may include a variety of computer-readable media that may be accessed by processor 120. In the various embodiments, memory 140 may include volatile and nonvolatile medium, removable and non-removable medium. For example, memory 140 may include any combination of random access memory ("RAM"), dynamic RAM (DRAM), static RAM (SRAM), read only memory ("ROM"), flash memory, cache memory, and/or any other type of non-transitory computer-readable medium. Alternatively, or additionally, memory 140 may include one or more network or cloud accessible storage media.

Although shown as a single system, the functionality of system 100 may be implemented as a distributed system. For example, memory 140 and processor 120 may be distributed across multiple different computers that collectively comprise system 100. In one embodiment, system 100 may be part of a device (e.g., personal computer, console, video game console, etc.), and system 100 provides haptic effect functionality for the device. In another embodiment, system 100 may be separate from the device, and may remotely provide the aforementioned functionality for the device.

System 100 may be operably connected to controller 150. Controller 150 may be a peripheral device configured to provide input to the system 100. Controller 150 may be operably connected to system 100 using either a wireless connection or a wired connection. Controller 150 also may include a local processor configured to communicate with system 100 using either a wireless connection or a wired connection. Alternatively, controller 150 may be configured to not include a local processor, and all input signals and/or output signals associated with controller 150 may be processed by the components of system 100. In embodiments in which controller 150 has a local processor, additional functionality, such as power limiter modules and peripheral firmware configured to provide control functionality may reside within controller 150.

Controller 150 may further include one or more digital buttons, one or more analog buttons, one or more bumpers, one or more directional pads, one or more analog or digital sticks, one or more driving wheels, and/or one or more user input elements that can be interacted with by a user, and that can provide input to system 100. Controller 150 may also include one or more analog or digital trigger buttons (or "triggers") that can further be interacted with by the user, and that can further provide input to system 100. As is described below in greater detail, controller 150 can further include a motor, or another type of actuator or haptic output device, configured to exert a bi-directional push/pull force on at least one trigger of controller 150.

Controller 150 can also include one or more actuators, or other types of haptic output devices. The local processor of controller 150, or processor 120 in embodiments where controller 150 does not include a local processor, may transmit a haptic signal associated with a haptic effect to at least one actuator of controller 150. The actuator, in turn, outputs haptic effects such as vibrotactile haptic effects, kinesthetic haptic effects, or deformation haptic effects, in response to the haptic signal. The haptic effects can be experienced at a user input element (e.g., a digital button, analog button, bumper, directional pad, analog or digital stick, driving wheel, or trigger) of controller 150. Alternatively, the haptic effects can be experienced at an outer surface of controller 150.

An actuator is an example of a haptic output device, where a haptic output device is a device configured to output haptic effects, such as vibrotactile haptic effects, electrostatic friction haptic effects, temperature variation, and/or deformation haptic effects, in response to a drive signal. In alternate embodiments, the one or more actuators within controller 150 can be replaced by some other type of haptic output device. The haptic output device may be, for example, an electric motor, an electro-magnetic actuator, a voice coil, a shape memory alloy, an electro-active polymer, a solenoid, an eccentric rotating mass motor ("ERM"), a harmonic ERM motor ("HERM"), a linear resonant actuator ("LRA"), a piezoelectric actuator, a high bandwidth actuator, an electroactive polymer ("EAP") actuator, an electrostatic friction display, or an ultrasonic vibration generator. In some instances, the haptic output device may include haptic output drive circuit. In some embodiments, the haptic output device may be unidirectional or bidirectional.

Controller 150 may further include one or more speakers. The local processor of controller 150, or processor 120 in embodiments where controller 150 does not include a local processor, may transmit an audio signal to at least one speaker of controller 150, which in turn outputs audio effects. The speaker may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

Controller 150 can further include one or more sensors. A sensor may be configured to detect a form of energy, or other physical property, such as, but not limited to, sound, movement, acceleration, bio signals, distance, flow, force/pressure/strain/bend, humidity, linear position, orientation/inclination, radio frequency, rotary position, rotary velocity, manipulation of a switch, temperature, vibration, or visible light intensity. The sensor may further be configured to convert the detected energy, or other physical property, into an electrical signal, or any signal that represents virtual sensor information, and controller 150 can send the converted signal to the local processor of controller 150, or processor 120 in embodiments where controller 150 does not include a local processor.

Figure 2:
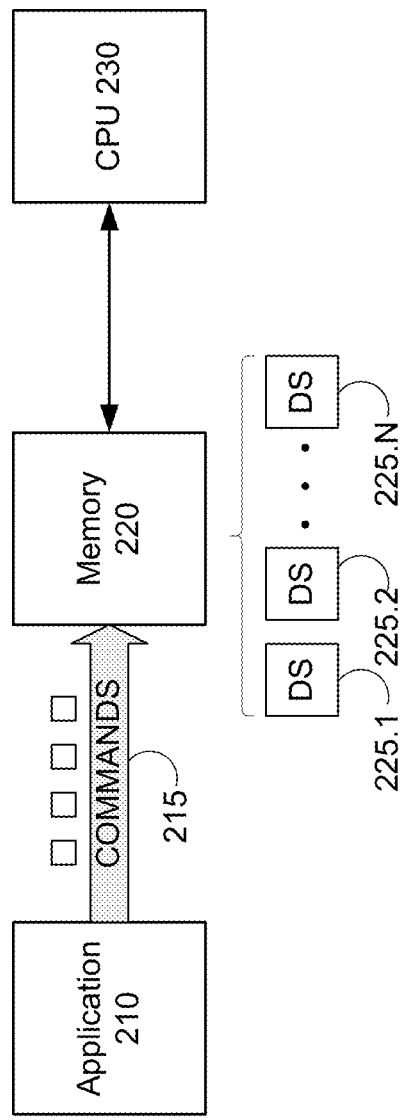
FIG. 2 is a simplified block diagram illustrating a system for distributing power according to an example embodiment of the present invention.

FIG. 2 is a simplified block diagram illustrating a system 200 for distributing power according to an example embodiment of the present invention.

As shown in FIG. 2, a CPU 230 may execute various programs, such as an application 210. As application 210 generates haptic instructions, such as haptic instruction 215, CPU 230 may assign a portion of its power budget to haptic output device(s) associated with each haptic instruction. CPU 230 may further determine and/or adjust the execution times of the haptic instructions.

Haptic instructions may be stored in a memory 220. Memory 220 also stores data structures 225.1-225.N, each of the data structures defining characteristics associated with respective haptic output devices. CPU 230 may execute haptic instructions according to data structures 225.1-225.N. For example, data structures 225.1-225.N may store one or more values relating to startup current, steady state current, stall current, settling time, priority, and the like that may be used by CPU 230 to determine power and/or current distributions for each haptic output device. In another example, data structures 225.1-225.N may store priority information that may be used by CPU 230 to ensure that haptic instructions associated with high priority haptic output device(s) are executed in a timely manner. For example, priority information may be used to allocate a larger portion of the budgeted power and/or current for haptic output devices with higher priority.

Figure 3:
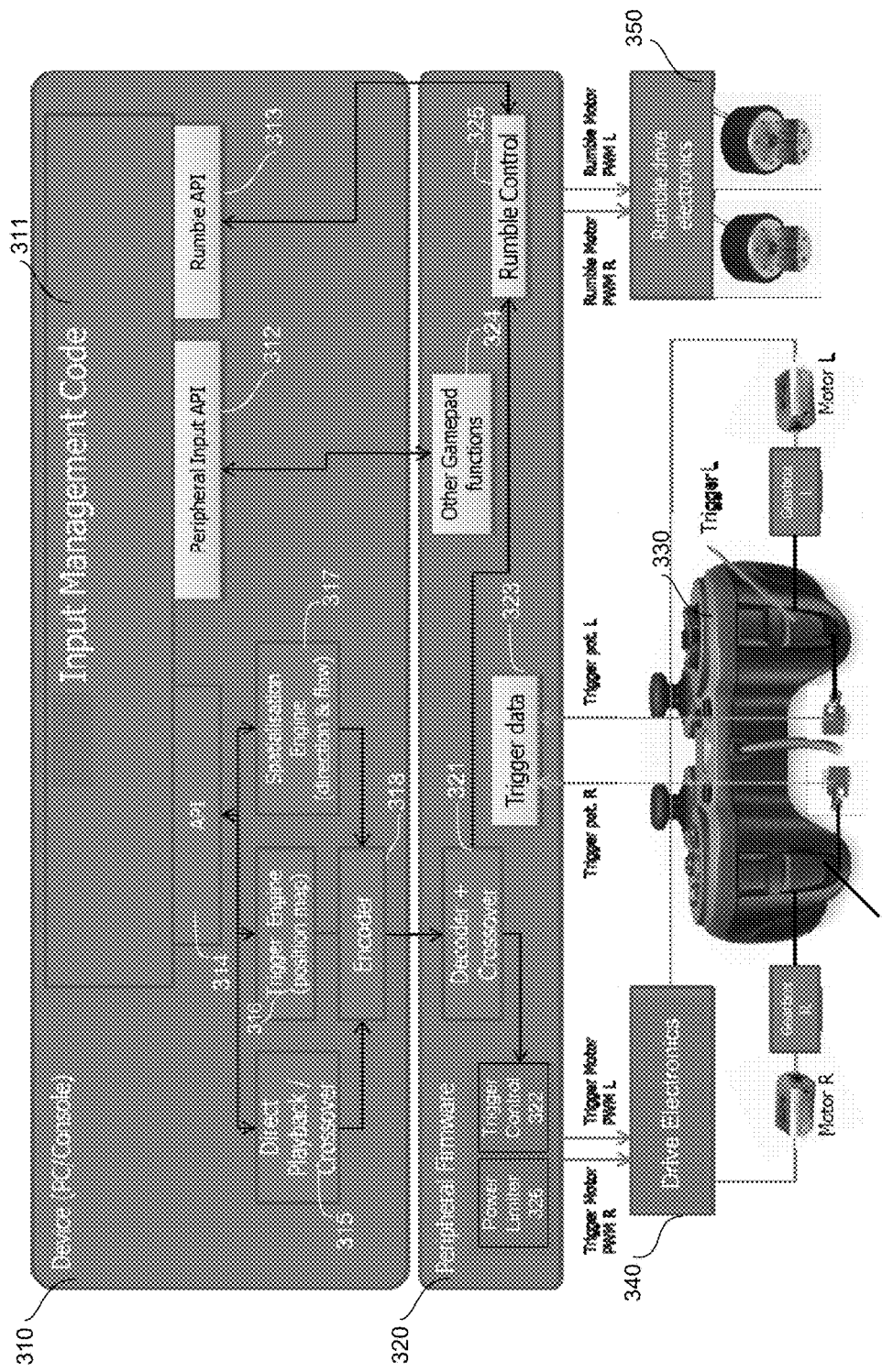
FIG. 3 illustrates a block diagram of a haptic effect software stack according to an example embodiment of the present invention.

FIG. 3 illustrates a block diagram of a haptic effect software stack 300 according to an example embodiment of the present invention. As shown in FIG. 3, software stack 300 includes device modules 310, peripheral firmware modules 320, controller modules 330, drive modules 340, and rumble drive modules 350. Haptic effect software stack 300 is implemented on a system, such as system 100 of FIG. 1.

Device modules 310 may include a variety of modules such as input management code 311, peripheral input application programming interface ("API") 312, rumble API 313, haptic effect API 314, direct playback/crossover 315, trigger engine 316, spatialization engine 317, and encoder 318.

Input management code 311 may include a set of computer-readable instructions that manage input provided by controller 330 in the context of a game application, or other type of application, executed within a device.

Peripheral input API 312 may include a set of computer-readable functions or routines that enable game input management code 311 to interact with peripheral firmware 320 in order to receive and manage input provided by controller 330.

Rumble API 313 may include a set of computer-readable functions or routines that enable input management code 311 to interact with peripheral firmware 320 in order to transmit rumble instructions to one or more rumble motors or rumble actuators of controller 330 (e.g., rumble motors L and R of FIG. 3). In addition, a rumble instruction may cause a rumble motor or rumble actuator of controller 330 to produce a general or rumble haptic effect.

Haptic effect API 314 (identified in FIG. 3 as "API") may include a set of computer-readable functions or routines that are accessible to input management code 311, and that enable input management code 311 to interact with peripheral firmware 320 in order to transmit haptic instructions to controller 330. In addition, a haptic instruction may cause one or more targeted motors or targeted actuators of controller 330 to produce a haptic effect at one or more user input elements of controller 330.

Haptic effect API 314 also may store one or more haptic effect definitions. A haptic effect definition is a data structure that includes haptic data, such as a haptic signal, that is pre-defined and that can be stored within a storage, such as a haptic file or haptic stream, and that can be sent to one or more rumble motors, rumble actuators, targeted motors, or targeted actuators, to produce a haptic effect at a component, or user input element, of controller 330. The haptic data can include one or more attributes of the corresponding haptic effect, where the attributes can be stored as parameters. Example parameters of a haptic effect definition may include an amplitude parameter, a frequency parameter, a waveform parameter, an envelope parameter, a magnitude (or strength) parameter, and a duration parameter.

Haptic effect API 314 may enable game input management code 311 to interact with direct playback/crossover 315, trigger engine 316, and spatialization engine 317, and may further manage direct playback/crossover 315, trigger engine 316, and spatialization engine 317 according to requests invoked by game input management code 311. Further, haptic effect API 314 may store data used for communication with peripheral firmware 320, and used for generation of one or more haptic effects.

Direct playback/crossover 315 may receive haptic data as input, produce haptic data as output, and transmit haptic data to one or more targeted motors, or targeted actuators, of controller 330 (e.g., motors L and R of FIG. 3). In some embodiments, direct playback/crossover 315 may output the input haptic data directly, without modifying a format of the input haptic data. This results in an "as-is" playback of the input haptic data. In other embodiments, direct playback/crossover 315 may convert the haptic data that is input from a first format to a second format, and can further output the converted haptic data. Depending on the type of playback, direct playback/crossover 315 may optionally use a programmable crossover to convert the haptic data. By converting the haptic data, device modules may deconstruct the haptic effect and playback the haptic effect at multiple actuators.

The format of the haptic data may be a haptic elementary stream ("HES") format. A HES format is a file or data format for representing haptic data that may be streamed to a device. The haptic data can be represented in a manner that is identical or similar to how uncompressed sound is represented, although the haptic data can be encrypted within the HES format.

Trigger engine 316 may receive haptic data, such as a haptic effect definition, and may modify the haptic data based on user input data, such as trigger data 323. Trigger data is data that includes one or more parameters that indicate a position and/or range of one or more triggers of controller 330 (e.g., triggers L and R of FIG. 3). Trigger engine 316 may further transmit haptic instructions to controller 330. For example, trigger engine 316 may transmit haptic instructions to a variety of user-input elements of controller 330. As previously described, a haptic instruction may cause one or more targeted motors or targeted actuators of controller 330 to produce a haptic effect at one or more user-input elements of controller 330.

Spatialization engine 317 may receive haptic data and may modify the haptic data based on spatialization data. Spatialization data may include data that indicates a desired direction and/or flow of a haptic effect, such as an ordering of haptic effects on respective user input elements. In certain embodiments, spatialization engine 317 may receive spatialization data that includes a direction and/or flow from input management code 311.

Spatialization engine 317 may modify the haptic data so that a haptic effect, such as a trigger haptic effect, is scaled for one or more rumble motors, or rumble actuators, of controller 330 (e.g., rumble motors L and R of FIG. 3), and that the haptic effect is also scaled for one or more targeted motors, or targeted actuators, of controller 330 (e.g., motors L and R, as illustrated in FIG. 3). In other words, spatialization engine 317 may modify the haptic data that is sent to each motor or actuator, and thus, modify the haptic effect that is experienced at each motor or actuator, in order to convey a sense of direction and flow of an overall haptic effect. For example, in order to emphasize a haptic effect experienced at a motor or actuator, spatialization engine 317 may scale one or more portions of the haptic effect. For example, spatialization engine 317 may scale haptic data that is sent to the motor or actuator that causes the haptic effect to be experienced, causing the haptic effect to be more pronounced (e.g., increased magnitude, duration, etc.). Additionally, spatialization engine 317 may scale haptic data that is sent to other motors or actuators, causing other haptic effects that are experienced at those motors or actuators to be less pronounced (e.g., decreased magnitude, duration, etc.). In some embodiments, spatialization engine 317 may modify the haptic data in real-time or substantially in real-time. Further, in some embodiments, spatialization engine 317 may have non-linear relationships between inputs and motor, or actuator, outputs in order to exaggerate an overall haptic effect.

Encoder 318 encodes haptic data received from direct playback/crossover 315, trigger engine 316, and/or spatialization engine 317 into a format. In one embodiment, the format may be an HES format. Encoder 318 may transmit the encoded haptic data to peripheral firmware 320.

Peripheral firmware 320 is firmware for one or more peripheral devices (e.g., controllers). Peripheral firmware 320 may include a variety of modules such as decoder and crossover 321, trigger control 322, trigger data 323, other functions 324, and rumble control 325.

Decoder and crossover 321 may receive the encoded haptic data from encoder 318 and decodes the encoded haptic data. In some embodiments, decoder and crossover 321 computes a programmable crossover in order to decode the encoded haptic data. Decoder and crossover 321 may compute the programmable crossover in real-time.

Trigger control 322 is a low-level control API for one or more targeted motors or targeted actuators of controller 330 (e.g., motors L and R of FIG. 3). Trigger control 322 may receive a trigger instruction and may convert the trigger instruction into a low-level trigger instruction for a specified targeted motor or targeted actuator of controller 330, and may transmit the low-level trigger instruction to the specified targeted motor or targeted actuator of controller 330. The low-level trigger instruction may cause the specified targeted motor or targeted actuator to produce a trigger haptic effect at a specified trigger of controller 330.

Trigger data 323, as previously described, is data that includes one or more parameters that indicate a position and/or range of one or more triggers of controller 330 (e.g., triggers L and R of FIG. 3). Trigger data 323 may be received from controller 330 by peripheral firmware 320. Peripheral firmware 320 may further store trigger data 323, and may further transmit trigger data 323 to device modules 310.

Other gamepad functions 324 may be functions of controller 330 managed by peripheral firmware 320. Such functions may include such functions as wired/wireless communications, input reporting, protocol implementation, power management, etc.

Rumble control 325 is a low-level control API for one or more rumble motors or rumble actuators of controller 330 (e.g., rumble motors L and R of FIG. 3). Rumble control 325 may receive a rumble instruction, may convert the rumble instruction into a low-level rumble instruction for a specified rumble motor or rumble actuator of controller 330, and may transmit the low-level trigger instruction to the specified rumble motor or rumble actuator of controller 330.

Power limiter module 326 may be a firmware module or standalone hardware chip (e.g., application specific integrated circuit, also referred to as "ASIC") that may limit the power and/or current consumption of the haptic output devices of controller 330. Power limiter module 326 may be configured to balance and/or schedule consumption of haptic output devices of controller 326. For each haptic instruction, power limiter module 326 may distribute a power budget (e.g., USB limit of 500 mA, USB 2.0 limit of 500 mA, etc.) among the haptic output devices. The power budget may be distributed to ensure that each haptic output device adequately renders the desired haptic effects. Power limiter module 326 and power limiter module 142 of FIG. 1 may be the same modules.

Controller 330 may include triggers L and R. Controller 330 may further include gear boxes L and R and motors L and R. Motor L and gearbox L are operably coupled to trigger L within controller 330. Likewise, motor R and gearbox R are operably coupled to trigger R within controller 330. When motor L receives a trigger instruction, motor L and gearbox L may collectively cause a trigger haptic effect to be experienced at trigger L. Likewise, when motor R receives a trigger instruction, motor R and gearbox R may collectively cause a trigger haptic effect to be experienced at trigger R. Peripheral firmware 320 may send trigger instructions to motors L and R of controller 330 using drive electronics 340.

Controller 330 may further include potentiometers L and R. Potentiometer L may detect a position and/or range of trigger L, and may further send the detected position and/or range of trigger L to peripheral firmware 320 as trigger data. Likewise, potentiometer R may detect a position and/or range of trigger R, and may further send the detected position and/or range of trigger R to peripheral firmware 320 as trigger data.

Controller 330 may further include rumble motors L and R. When rumble motor L receives a rumble instruction, rumble motor L causes a haptic effect to be experienced along a left component of controller 330. Likewise, when rumble motor R receives a rumble instruction, rumble motor R causes a haptic effect to be experienced along a right component of controller 330. Peripheral firmware 320 may send rumble instructions to rumble motors L and R using rumble drive electronics 350.

Figure 4:
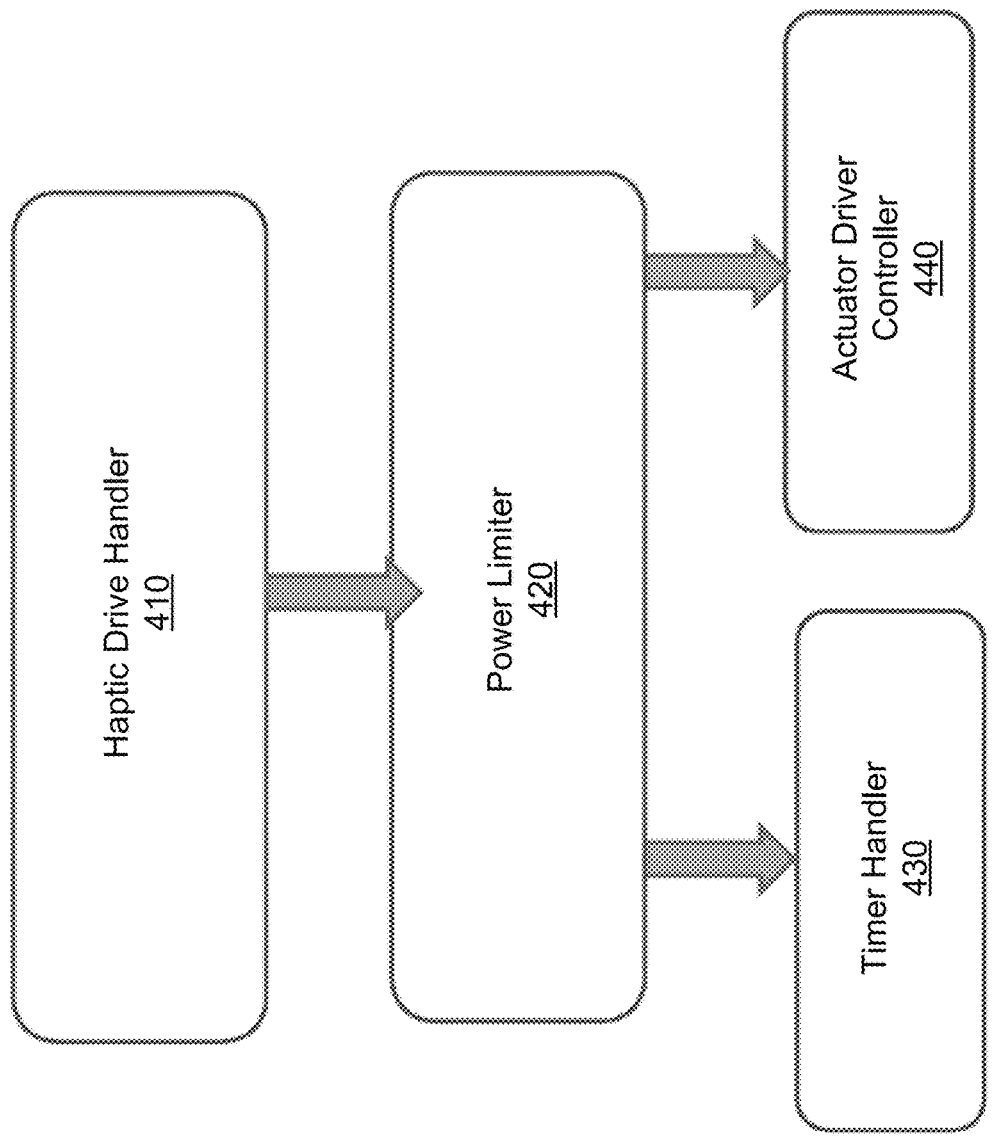
FIG. 4 illustrates a power limiting architecture according to an example embodiment of the present invention.

FIG. 4 illustrates a power limiting architecture according to an example embodiment of the present invention.

A haptic drive handler 410 may be configured with a timer handler 430 to track the timing and state of each haptic output device. Disposed between haptic drive handler 410 and timer handler 430, a power limiter 420 may be configured to distribute the power budget among the haptic output devices. In addition, power limiter 420 may schedule haptic drive signals in order to ensure that the overall power budget is not exceeded.

Figure 5:
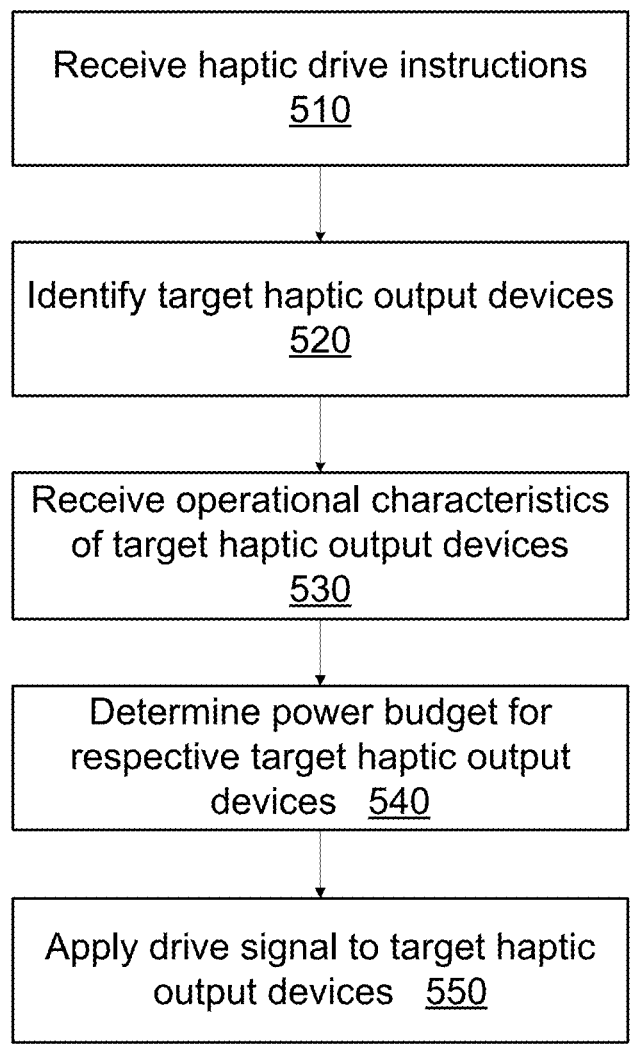
FIG. 5 illustrates a method for controlling power consumption of a haptic output device according to an example embodiment of the present invention.

FIG. 5 illustrates a flow diagram of functionality 500 for controlling power consumption of a haptic output device according to an example embodiment of the present invention. In some instances, the functionality of the flow diagram of FIG. 5 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 500 may receive one or more haptic drive instructions, at 510. Haptic drive instructions may be generated by a software application, such as a gaming application. Upon receipt of the haptic drive instructions, method 500 may identify respective target haptic output device(s) associated with each of the received haptic drive instructions, at 520. In addition, functionality 500 may further receive the operational characteristics associated with each of the identified target haptic output devices associated with the received haptic instructions, at 530. Here, one or more data structures may store the operational characteristics for respective haptic output devices. Next, functionality 500 may allocate the power budget among the target haptic output devices based on their operational characteristics, at 540. In order to ensure that power consumption remains below the power budget value, functionality 500 may calculate power usage for each of the haptic output devices in real time, or substantially real time. The power budget may represent a limited power or current available to render haptic effects. For example, applications utilizing a Universal Serial Bus ("USB") channel may be limited to an overall current of 500 mA. Lastly, functionality 500 may apply a drive signal to target haptic output devices based upon their respective allocations of the power budget. By employing functionality 500, the overall power consumption of the system is reduced without drastically affecting the haptic experience.

Figure 6:
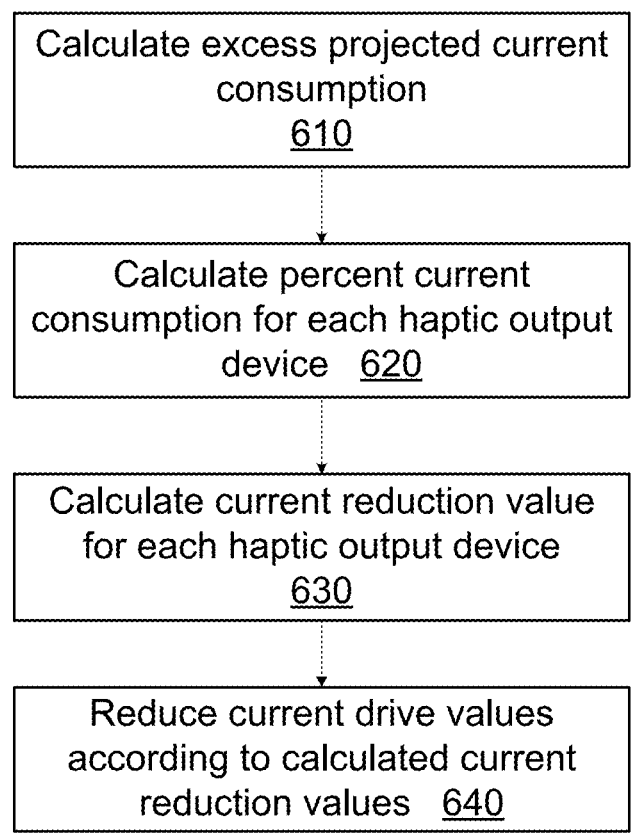
FIG. 6 illustrates a method for allocating a power budget to a plurality of haptic output devices according to an example embodiment of the present invention.

FIG. 6 illustrates flow diagram of functionality 600 for allocating a power budget to a plurality of haptic output devices according to an example embodiment of the present invention.

At the outset, functionality 600 may calculate excess projected current consumption, at 610. Here, functionality 600 may rely upon data stored within data structures associated with the target haptic output devices, such as startup current, steady state current, stall current, settling time, etc. Next, at 620, functionality 600 may calculate the percent current consumption for each target haptic output device. Then, at 630, functionality 600 may calculate a current reduction value for each target haptic output device. Lastly, functionality 600 reduces current drive values for the target haptic output devices according to the calculated current reduction values, at 640.

Functionality 600 will now be illustrated by the following example. In this example, four target haptic output devices are assumed, such as two rumble output devices and two trigger devices. Here, each rumble output device may have a startup current of 200 mA, a steady state current of 80 mA, and a settling time of 100 ms. Each of the trigger output devices may have a startup current of 250 mA and a stall current of 250 mA. Typically, trigger output devices may start from a rest state, but may not reach the steady state condition, as does the rumble output device. Returning to the example, it is contemplated that both trigger output devices may stall while the rumble output devices are starting from a rest state. Thus, the target haptic output devices may consume up to 900 mA (250+250+200+200). However, by implementing embodiments of the present invention, such as functionality 600, the target haptic output devices may not exceed the budgeted current of 450 mA.

In this example, the projected excess current (610) is calculated to be 450 mA (900−450). Next, functionality 600 calculates the percentage of current consumption for each target haptic output device (620). In this example, each of the trigger output devices consumes 28% (250÷900) of the total current, and each of the rumble output devices consumes 23% (200÷900) of the total current. Then, functionality 600 calculates the current reduction value for each target haptic output device (step 630). Here, the current reduction values may be attained by multiplying the current consumption percentage by the excess current. Accordingly, each trigger output device has a current reduction value of 126 mA (28/100*450), and each rumble output device has a current reduction value of 103.5 mA (23/100*450). Lastly, functionality 600 reduces the drive values associated with the target haptic output devices by the calculated reduction values to thereby reduce the overall system current and/or power consumption by the excess current (640).

By employing functionality 600, none of target haptic output devices is denied current and overall current and/or power consumption is reduced. In some instances, the haptic output devices may be utilized in proportion to their respective priorities. For example, higher priorities may be assigned to trigger output devices and lower priority values assigned to rumble output devices. In this example, trigger output devices may be driven at the requested values while rumble output devices may be soft started by gradually achieving the requested values.

Such soft starts may be applied in order to avoid exceeding the overall current budgets. In order to reduce the initial current spike, the haptic output device may be slowly driven at an increasing voltage over a period of time. The duration of the soft start and the rate of voltage increase may be stored in the data structure associated with the haptic output device or in a separate lookup table. In some instances, multiple lookup tables may be used for each direction of spin in the case of a bidirectional haptic output device.

Figure 7A:
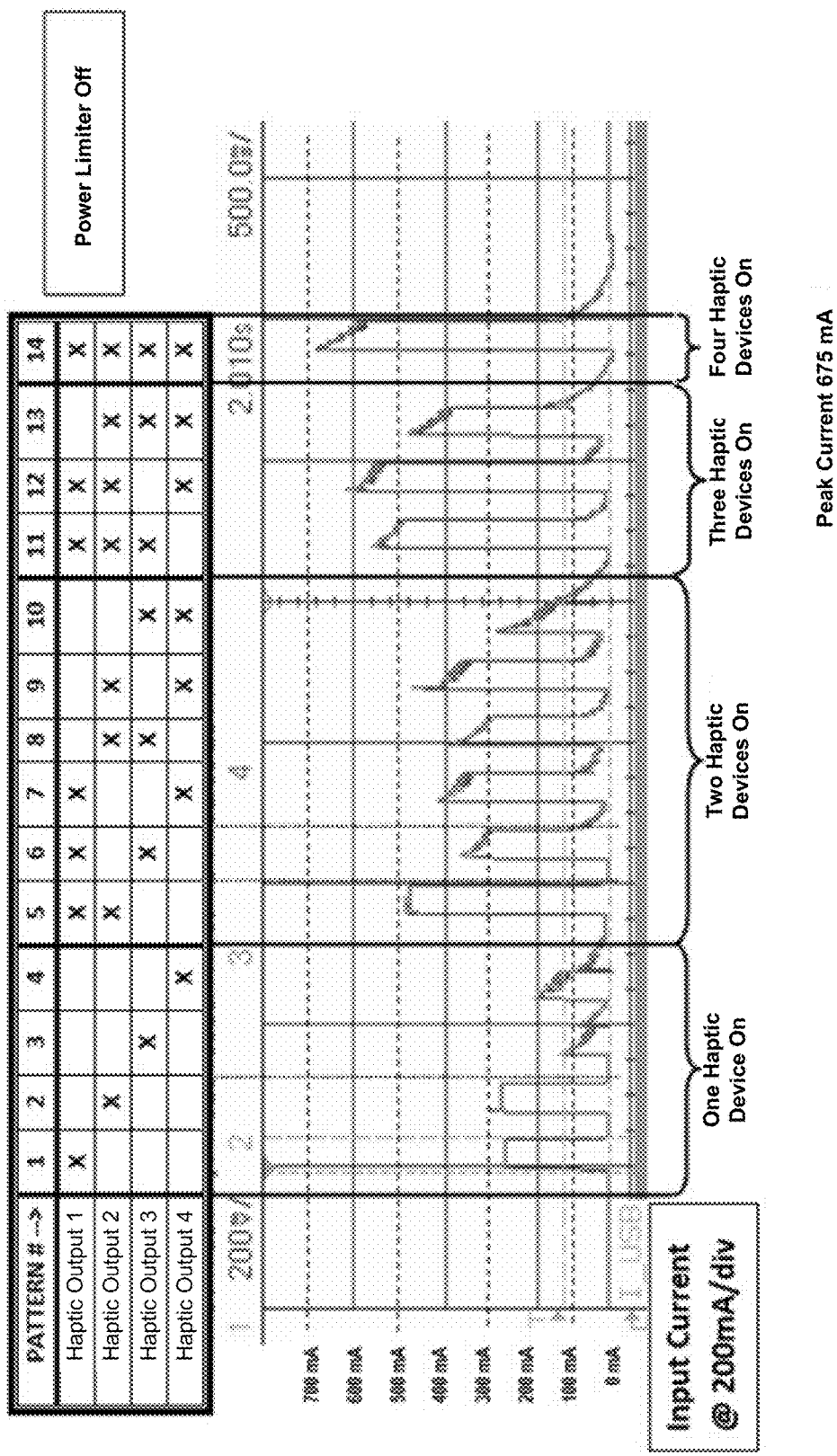
FIGS. 7A and 7B graphically illustrate a reduction in peak current achieved by implementing the example embodiments of the present invention.
Figure 7B:
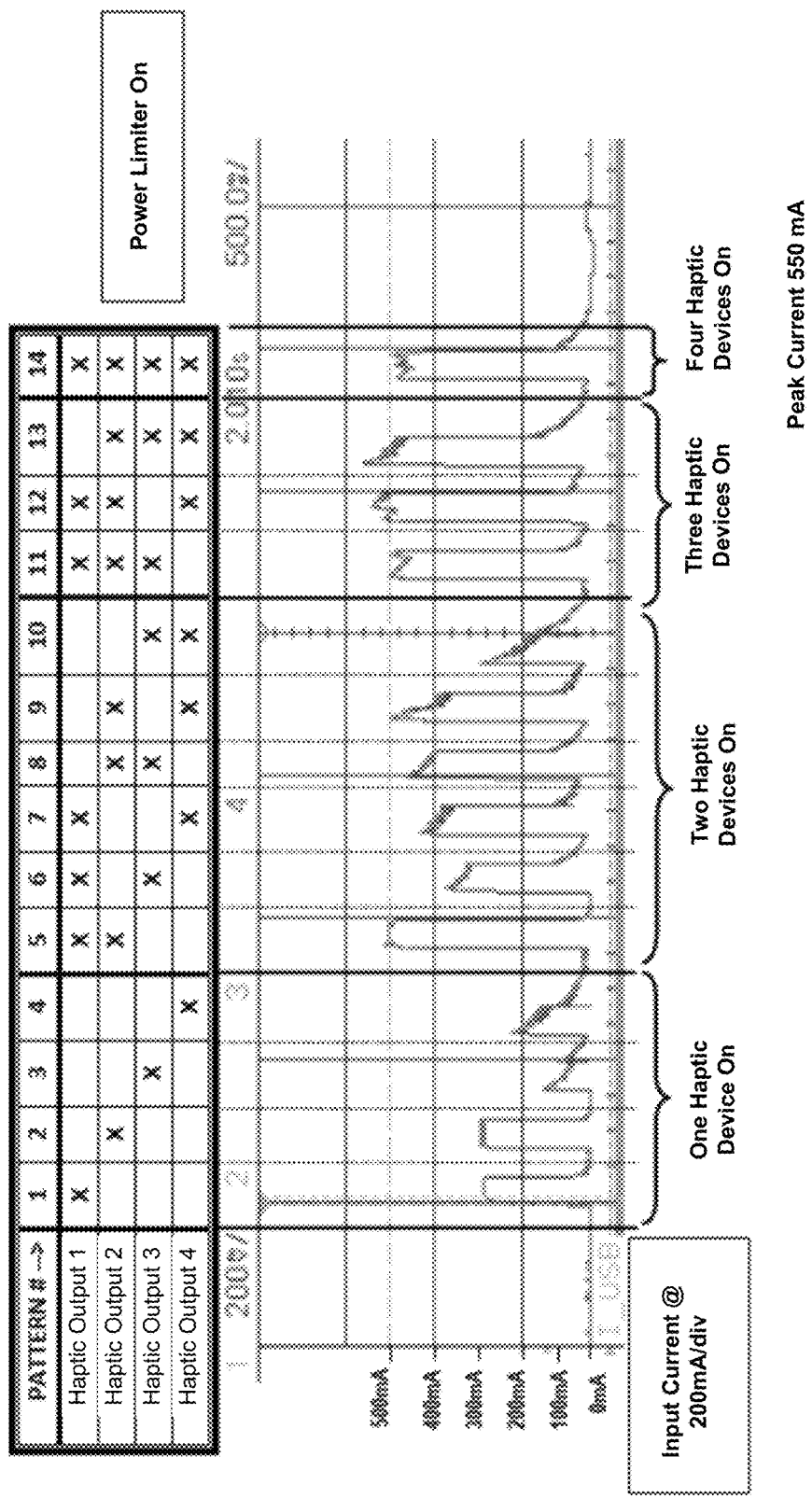

FIGS. 7A and 7B graphically illustrate a reduction in peak current achieved by implementing the example embodiments of the present invention. As shown in graph 710 of FIG. 7A, a peak current of 675 mA may be reached when four haptic output devices are simultaneously activated. By contrast, the peak current may be reduced to 550 mA by implementing the power limiter embodiments. For example, graph 720 of FIG. 7B illustrates a peak current of 550 mA when four haptic output devices are simultaneously activated.

FIG. 8 illustrates a data structure 800 according to an example embodiment of the present invention. Data structure 800 maintains the operational characteristics for respective haptic output devices. Power limiter modules 142 and/or 420 may store data structure 800 for each haptic output device. In some instances, data structure 800 may be stored as metadata.

Actuator index 810 may be used to uniquely identify each of the haptic output devices. Priority field 820 may be used to assign priority values to each haptic output device. For example, a haptic output device having a higher priority field 820 may be assigned a larger portion of the overall power budget compared to a haptic output device having a lower priority field 820. In another example, haptic instructions for higher priority haptic output devices may be processed before haptic instructions for lower priority haptic output devices. In some instances, priority field 820 may have a range of values between 1 and the total number of haptic output devices, with the priority decreasing as the numerical value of the priority increases.

When haptic instructions are received, request queue 830 may indicate a queuing order for each haptic output device. For example, incoming haptic instructions may be stored in memory and may populate a queue. Here, incoming haptic instructions may be executed according to the queuing order of an associated haptic output device.

Bidirectional field 840 may be used to indicate whether the haptic output device is bidirectional. For example, bidirectional field 840 may have a value of 1 when the haptic output device is configured to operate in forward and reverse directions. Bidirectional field 840 may be stored because increased current is drawn when a haptic output device changes direction.

Startup current maximum 850 may be the maximum expected current (e.g., in mA) that the haptic output device may consume when initiated from rest at a maximum voltage. For example, if the haptic output device is designed to be driven at 5V, startup current maximum 850 may indicate the value of startup current consumption when driven at 5V. In addition, settling time 860 indicates the time taken by the haptic output device to reach the steady state current, and steady state current 870 may indicate the maximum current (e.g., in mA) that the haptic output device consumes at steady state condition.

Status field 880 may be used to track the activity status of the haptic output device. In addition, status field 880 may be updated when the haptic output device is enabled or disabled. Lastly, haptic write field 890 may be called by the power limiter modules to set the drive power or current value of the haptic output device. For example, the driver current for the haptic output device, as determined by the power limiter modules, may be stored in haptic write field 890.

Data structure 800 may be updated in response to executing received haptic instructions. Thus, data structure 800 may track the present state of the haptic output devices by updating the status of each haptic output device and estimating activities and conditions of the haptic output device based on the various fields 810-890 stored therein.

Figure 9:
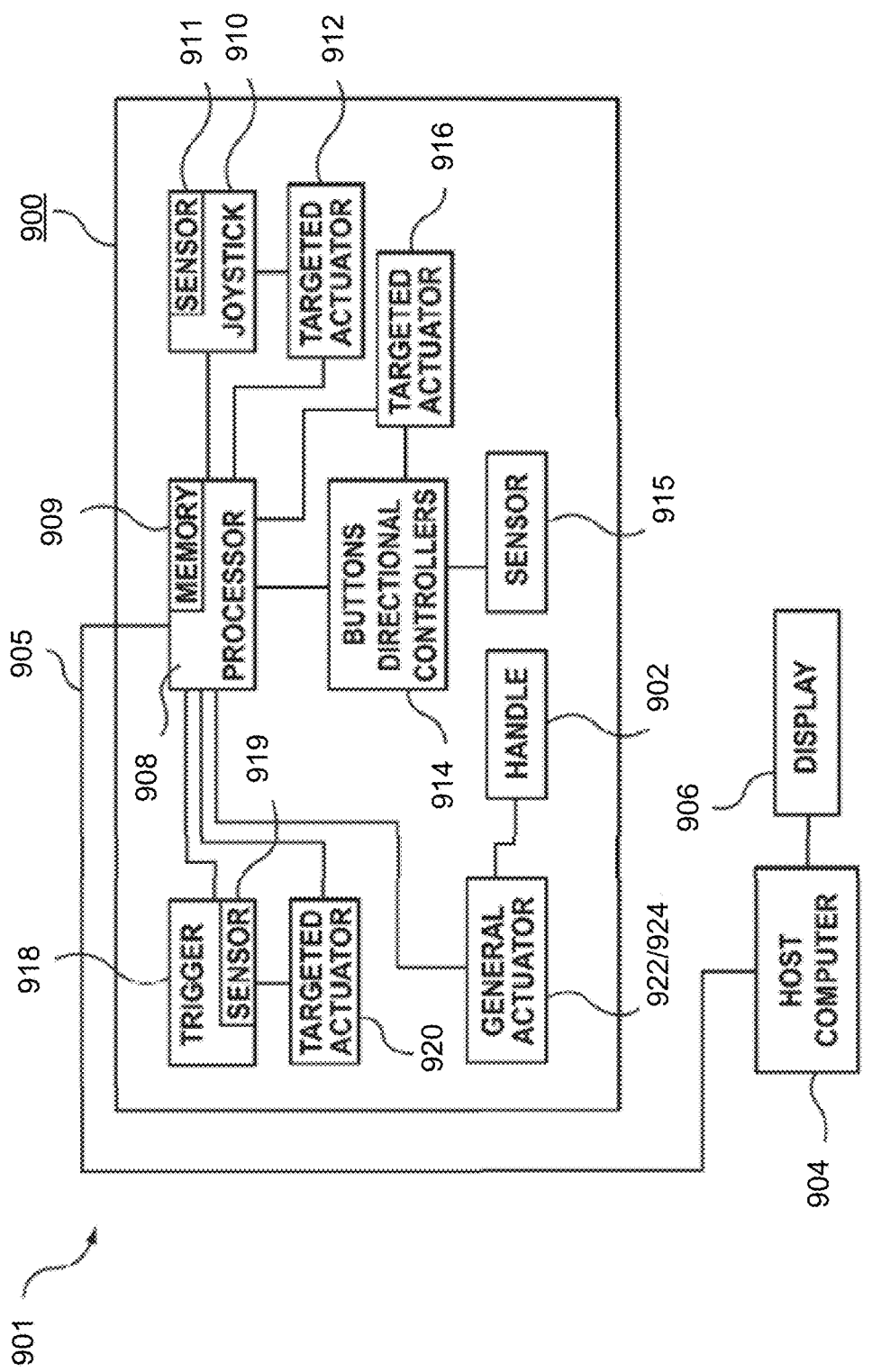
FIG. 9 illustrates a functional block diagram of a controller suitable for use with the embodiments of the present invention.

FIG. 9 illustrates a functional block diagram of a controller 900 suitable for use with the embodiments of the present invention.

As illustrated in FIG. 9, controller 900 may include one or more of a variety of user input elements. A user input element may refer to any interface device manipulated by the user to interact with host computer 904. Example user input elements include analog or digital joy stick 910, button 914, trigger 918, and the like. As understood by one of ordinary skill in the art, one or more of each user input element may be included on controller 900. For example, the present description of trigger 918 does not limit controller 900 to a single trigger. Similarly, those skilled in the art understand that multiple analog or digital sticks, buttons, and other user input elements may be used.

Controller 900 may include local processor 908. Local processor 908 may exchange commands and data with host computer 904 via connection 905. Connection 905 may be a wired or wireless connection using one or more communication protocols known to those skilled in the art. In some instances, controller 900 may be alternatively configured to not include local processor 908. Here, input/output signals from controller 900 may be handled and processed directly by host computer 904. Host computer 904 may be a gaming device console and display device 906 may be screen which is operably coupled to the gaming device console. In some instances, host computer 904 and display device 906 may be combined into a single device.

Controller 900 may include targeted actuators 912, 916, 920 (e.g., motors) to directly drive each of the user input elements thereof as well as one or more general or rumble actuators 922, 924 operably coupled to housing 902 in a location where a hand of the user is generally located. More particularly, analog or digital stick 910 includes a targeted actuator or motor 912 operably coupled thereto, button 914 includes a targeted actuator or motor 916 operably coupled thereto, and trigger 918 includes a targeted actuator or motor 920 operably coupled thereto. In addition to a plurality of targeted actuators, controller 900 includes a position sensor operably coupled to each of the user input elements thereof. More particularly, analog or digital stick 910 includes a position sensor 911 operably coupled thereto, button 914 includes a position sensor 915 operably coupled thereto, and trigger 918 includes a position sensor 919 operably coupled thereto. Local processor 908 is operably coupled to targeted actuators 912, 916, 920 as well as position sensors 911, 915, 919 of analog or digital stick 910, button 914, and trigger 918, respectively. In response to signals received from position sensors 911, 915, 919, local processor 908 instructs targeted actuators 912, 916, 920 to provide directed or targeted kinesthetic effects directly to analog or digital stick 910, button 914, and trigger 918, respectively. Such targeted kinesthetic effects are discernible or distinguishable from general or rumble haptic effects produced by general actuators 922, 924 along the entire body of the controller. The collective haptic effects provide the user with a greater sense of immersion to the game as multiple modalities are being simultaneously engaged (e.g., video, audio, and haptics).

Figure 10A:
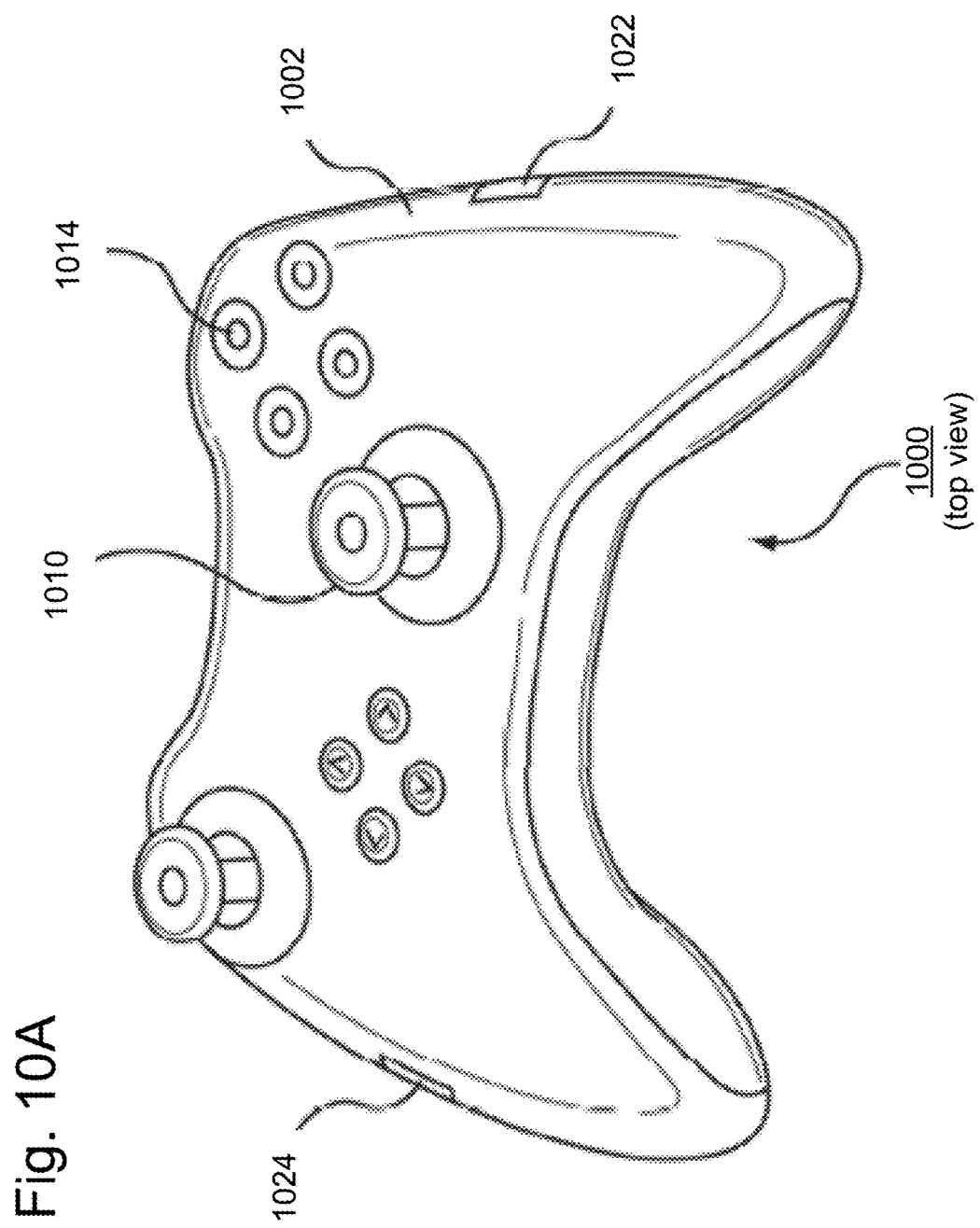
FIGS. 10A and 10B illustrate different views of a controller suitable for use with the embodiments of the present invention.
Figure 10B:
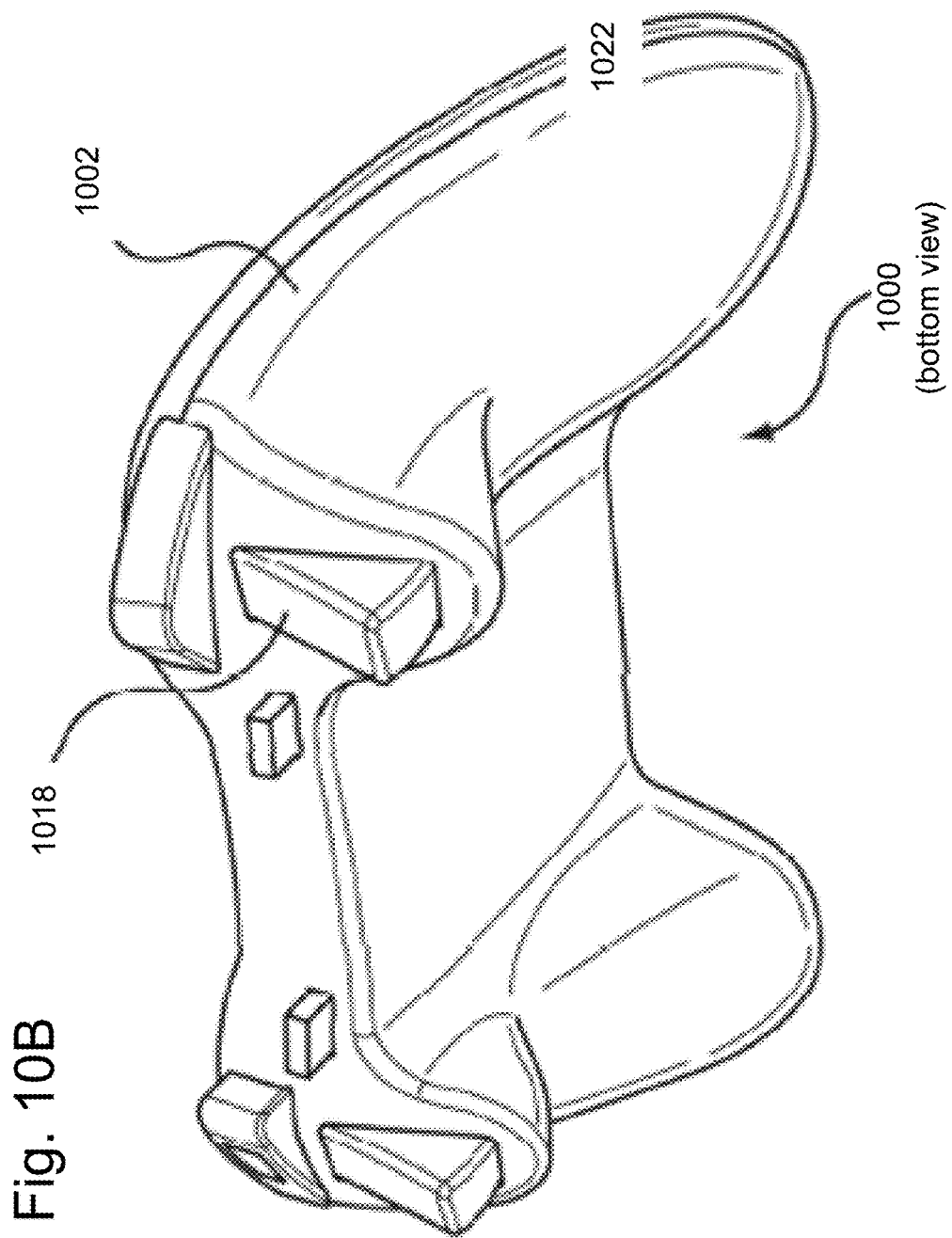

FIGS. 10A and 10B illustrate different views of a controller 1000 suitable for use with the embodiments of the present invention. As shown in FIG. 10A and FIG. 10B, controller 1000 may include a variety of components such as housing 1002, analog or digital joy stick 1010, button(s) 1014, trigger 1018, and rumble actuators 1022 and 1024.

Housing 1002 is shaped to easily accommodate user gripping of controller 1000. Controller 1000 is an example embodiment of a controller, and the embodiments of the invention may be readily applied to other controller shapes.

Accordingly, haptic effects may be more efficiently generated by adopting the various embodiments of the present invention. For example, at any particular moment in time, the overall power or current drawn by the haptic output devices of the controller may be reduced. In addition, the haptic experience of the user is not diminished.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method for controlling current consumption of a haptic output device, the method comprising:
   receiving a haptic drive instruction for the haptic output device;
   determining an excess projected current and an available current for the haptic output device based on a startup current or a steady state current of the haptic output device;
   determining a current reduction value for the haptic output device based on the excess projected current and the available current; and
   applying a drive signal to the haptic output device to produce a haptic effect, the drive signal based on the current reduction value.

2. The method according to claim 1, wherein the haptic output device is included within a controller or gamepad.

3. The method according to claim 1, wherein the haptic effect is produced at a user input element of a peripheral device.

4. The method according to claim 1, wherein the startup current or the steady state current of the haptic output device is stored in a data structure that further includes priority information.

5. The method according to claim 4, wherein the data structure further includes one of queue information, bidirectional information, or status information.

6. The method according to claim 1, wherein the haptic output device is a trigger or a rumble output device.

7. The method according to claim 1, wherein a timing of the drive signal is adjusted based on the available current.

8. The method according to claim 1, wherein the haptic output device is bi-directional.

9. The method according to claim 1, wherein the available current comprises a limited current that is available to render a plurality of haptic effects.

10. A device comprising:
    a processor; and
    a memory storing a program for execution by the processor, the program including instructions for controlling current consumption of a haptic output device, the instructions comprising:
    receiving a haptic drive instruction for the haptic output device;
    determining an excess projected current and an available current for the haptic output device based on a startup current or a steady state current of the haptic output device;
    determining a current reduction value for the haptic output device based on the excess projected current and the available current; and
    applying a drive signal to the haptic output device to produce a haptic effect, the drive signal based on the current reduction value.

11. The device according to claim 10, wherein the haptic output device is included within a controller or gamepad.

12. The device according to claim 10, wherein the haptic effect is produced at a user input element of a peripheral device.

13. The device according to claim 10, wherein the startup current or the steady state current of the haptic output device is stored in a data structure that further includes priority information.

14. The device according to claim 13, wherein the data structure further includes one of queue information, bidirectional information, or status information.

15. The device according to claim 10, wherein the haptic output device is a trigger or a rumble output device.

16. The device according to claim 10, wherein a timing of the drive signal is adjusted based on the available current.

17. The device according to claim 10, wherein the haptic output device is bi-directional.

18. A non-transitory computer readable storage medium storing a program configured to be executed by a processor to control current consumption of a haptic output device, the program comprising instructions for:
    receiving a haptic drive instruction for the haptic output device;
    calculating an excess projected current for the haptic output device;
    determining an available current for the haptic output device based on a startup current or a steady state current of the haptic output device;
    calculating a current reduction value based on the available current;
    applying a drive signal to the haptic output device to produce a haptic effect, the drive signal based on the current reduction value.

19. The non-transitory computer readable storage medium of claim 18, wherein the haptic output device is included within a controller or gamepad.

20. The non-transitory computer readable storage medium of claim 18, wherein the haptic effect is produced at a user input element of a peripheral device.

21. The non-transitory computer readable storage medium of claim 18, wherein the startup current or the steady state current of the haptic output device is stored in a data structure that further includes priority information.

22. The non-transitory computer readable storage medium of claim 21, wherein the data structure further includes one of queue information, bidirectional information, or status information.

23. The non-transitory computer readable storage medium of claim 18, wherein the haptic output device is a trigger or a rumble output device.

24. The non-transitory computer readable storage medium of claim 18, wherein a timing of the drive signal is adjusted based on the available current.

25. The non-transitory computer readable storage medium of claim 18, wherein the haptic output device is bi-directional.

* * * * *